(No Model.)
H. M. GOODMAN.
SELF OILING AXLE.
No. 422,764.                      Patented Mar. 4, 1890.
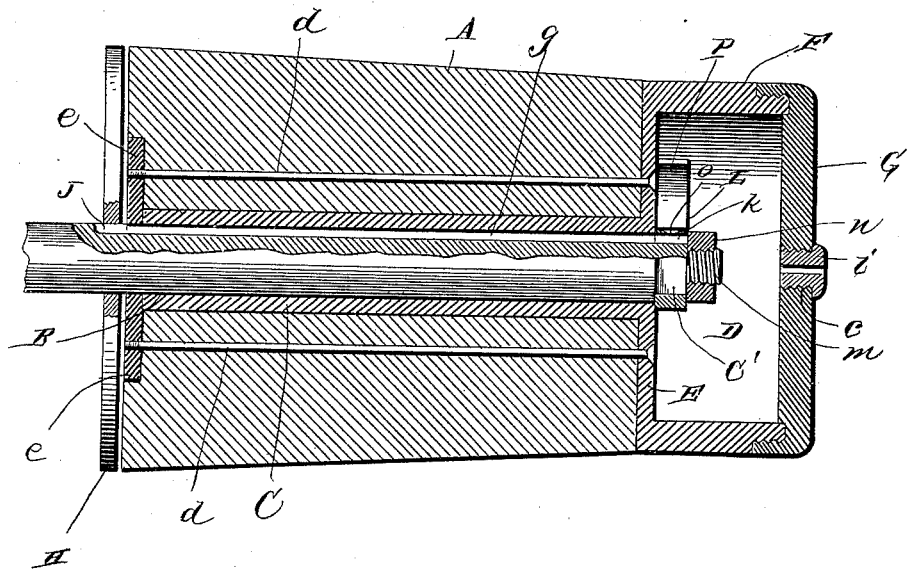
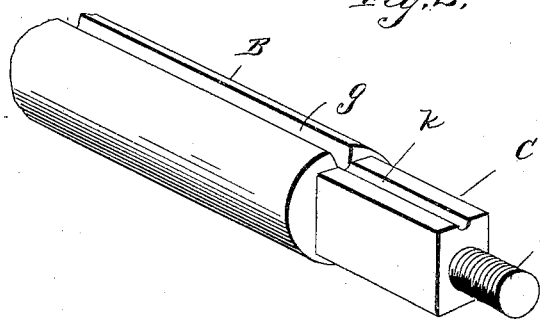
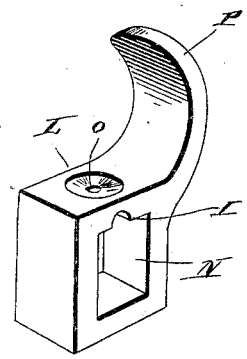
Witnesses
Inventor
Henry M. Goodman,
By his Attorney
E. W. Anderson

UNITED STATES PATENT OFFICE.

HENRY M. GOODMAN, OF LOUISVILLE, KENTUCKY.

SELF-OILING AXLE.

SPECIFICATION forming part of Letters Patent No. 422,764, dated March 4, 1890.

Application filed September 16, 1889. Serial No. 323,983. (No model.)

*To all whom it may concern:*

Be it known that I, HENRY M. GOODMAN, a citizen of the United States, and a resident of Louisville, in the county of Jefferson and State of Kentucky, have invented certain new and useful Improvements in Self-Oiling Axles; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical longitudinal section, and Figs. 2 and 3 are detail views.

This invention relates to self-oiling axles; and it consists in the novel construction and combination of parts, as hereinafter described, and pointed out in the claims.

In the accompanying drawings, the letter A designates the hub of a wheel surrounding a metallic boxing or bearing in which the spindle B of the axle is journaled. The boxing or casting consists of the internal tubular portion C and the outer end casing or oil chamber D, formed integral therewith. The oil-chamber has a rear annular wall or shoulder E, against which the outer end of the hub abuts externally, and a circumferential wall F, externally threaded at the rim to engage the cap G, having a central internally-threaded orifice $c$ to receive a ventilating-plug $i$. The boxing is secured to the hub by bolts $d\ d$, passing through the annular shoulder E, and extending therefrom longitudinally through the hub to a countersunk washer or ring $e$ at the inner end of the hub, into which the ends of the bolts are secured. The spindle which is journaled in the boxing has a superficial oil-distributing groove $g$ extending throughout its length and terminating in a perforation J of a collar or vertical annular flange H, which bears against the rear of the hub. The outer extremity of the spindle B is provided with a square or prismatic bearing C', integral therewith, and having a groove $k$ and threaded projection $m$ to receive the securing-nut $n$.

L indicates a winged washer or block having a rectangular or prismatic opening N to engage the angular portion C' of the spindle, and provided with a transversely-curved wing or arm P, rising from the forward upper angle thereof. This washer is also provided with a longitudinal groove I in the upper wall of its passage or opening N, and with a perforation $o$ in its top communicating therewith through said wall. When this washer is fitted to the end of the spindle, its groove I is just over and parallel with the groove $k$ of the bearing C, and communicates directly with the groove of the spindle proper. The concavity of the wing or guard P is always presented toward the upper surface of the washer, and when the vehicle is in motion the oil is carried around the interior of the oil-chamber, and the wing P of the washer projecting above receives against its concave surface particles of the lubricant and directs the same to the orifice O of the washer, whence it passes through to the groove beneath to be distributed on the surface of the spindle. When the cap G is screwed to the casing D, the oil-chamber is complete, and it can then be filled with oil to the level of the opening $c$, and finally the plug $i$, which has a central ventilating-perforation $s$, is screwed in place.

What I claim as new, and desire to secure by Letters Patent, is—

1. In an axle-lubricator, the combination, with the axle having a grooved spindle provided with a grooved angular end-bearing, of an angular washer or block for the said end-bearing, having a curved upward-projecting wing, and a vertical passage communicating with an internal groove registering with the groove of the end-bearing, substantially as shown and described.

2. In an axle-lubricator, the combination, with a grooved axle-spindle provided with a grooved prismatic end-bearing, of the internally-grooved and winged washer or block and the oil-chamber formed integral with the boxing or bearing of the spindle and inclosing the winged washer or block, substantially as specified.

3. The combination, with a hub-boxing having an oil-chamber at its outer end, of the grooved spindle, its nut, and the oil-directing washer or block having a transversely-projecting wing or arm within the oil-chamber, and a perforation through its wall communicating with an interior groove registering with the groove of the spindle, substantially as specified.

In testimony whereof I affix my signature in presence of two witnesses.

HENRY M. GOODMAN.

Witnesses:
JOSEPH SHORT,
J. B. QUIN.